(12) United States Patent
Cho

(10) Patent No.: US 8,740,434 B2
(45) Date of Patent: Jun. 3, 2014

(54) LIGHT GUIDE ELEMENT, LIGHT SOURCE MODULE, AND DISPLAY

(75) Inventor: Chun-Hsien Cho, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 434 days.

(21) Appl. No.: 13/182,472

(22) Filed: Jul. 14, 2011

(65) Prior Publication Data
US 2012/0300498 A1  Nov. 29, 2012

(30) Foreign Application Priority Data

May 23, 2011 (TW) .............................. 100117979 A

(51) Int. Cl.
*F21V 7/04* (2006.01)
*F21V 7/00* (2006.01)

(52) U.S. Cl.
CPC ............ *G02B 6/0018* (2013.01); *G02B 6/0073* (2013.01); *G02B 6/0096* (2013.01); *F21V 7/00* (2013.01)
USPC ...... 362/555; 362/217.05; 362/301; 362/302; 362/610; 362/561

(58) Field of Classification Search
CPC ...... F21V 7/00; G02B 6/0018; G02B 6/0073; G02B 6/0096
USPC ............... 362/217.05, 217.07, 301, 302, 346, 362/555, 560, 561, 610
See application file for complete search history.

(56) References Cited

U.S. PATENT DOCUMENTS

| 6,547,400 | B1 | 4/2003 | Yokoyama | |
|---|---|---|---|---|
| 7,042,599 | B2 | 5/2006 | Yokota et al. | |
| 7,131,735 | B2 * | 11/2006 | Yokoyama | ...................... 353/98 |
| 2004/0252522 | A1 | 12/2004 | Wu | |
| 2005/0180159 | A1 | 8/2005 | Wu et al. | |
| 2010/0188018 | A1 * | 7/2010 | Salm | ............................ 362/231 |

FOREIGN PATENT DOCUMENTS

| CN | 1570719 | 1/2005 |
|---|---|---|
| CN | 1916487 | 2/2007 |
| TW | 200427947 | 12/2004 |
| TW | 201003162 | 1/2010 |

OTHER PUBLICATIONS

"Office Action of Taiwan counterpart application" issued on Nov. 18, 2013, p. 1-p. 6.
"First Office Action of China counterpart application" issued on Dec. 3, 2013, p. 1-p. 6.

* cited by examiner

*Primary Examiner* — Stephen F Husar
(74) *Attorney, Agent, or Firm* — Jianq Chyun IP Office

(57) ABSTRACT

A light guide element, a light source module, and a display are provided. The display includes a display panel and the light source module. The light source module includes a light source and the light guide element, wherein light emitted by the light source is guided toward the display panel by the light guide element. The light guide element includes a plurality of sidewalls and a bottom wall. The sidewalls surround the bottom wall and are connected with each other to form a light entering opening, a light exiting opening, and an inner reflection room. Each of the sidewalls and the bottom wall has at least one reflection surface, wherein the reflection surface faces the inner reflection room.

17 Claims, 4 Drawing Sheets

LIGHT GUIDE ELEMENT, LIGHT SOURCE MODULE, AND DISPLAY

CROSS-REFERENCE TO RELATED APPLICATION

This application claims the priority benefit of Taiwan application serial no. 100117979, filed May 23, 2011. The entirety of the above-mentioned patent application is hereby incorporated by reference herein and made a part of this specification.

BACKGROUND OF THE INVENTION

1. Field of the Invention

The invention generally relates to a light guide element, a light source module, and a display, and more particularly, to a light guide element having a non-solid structure, a light source module and a display using the same.

2. Description of Related Art

A conventional light guide plate is a solid column. A post-production process (for example, disposition of microstructures, mesh points, or a reflection film or curvature modification) is usually performed on a light guide plate to enhance the light guide performance of the light guide plate, so as to allow a light source module using the light guide plate to achieve a uniform light emission effect.

However, aforementioned post-production processes performed on a light guide plate require moulds to be used therefore may produce some errors. As a result, the luminous efficiency and luminous uniformity of the light guide plate may be affected.

SUMMARY OF THE INVENTION

Accordingly, the invention is directed to a light guide element having a non-solid structure.

The invention is directed to a light source module with a uniform light emission effect.

The invention is directed to a display offering a good display quality.

The invention provides a light guide element including a plurality of sidewalls and a bottom wall. The sidewalls surround the bottom wall and are connected with each other to form a light entering opening, a light exiting opening, and an inner reflection room, wherein each of the sidewalls and the bottom wall has at least one reflection surface, and the reflection surfaces face the inner reflection room.

The invention provides a light source module using the light guide element. The light source module includes a light source and the light guide element. The light source is located by the light guide element and facing the light entering opening.

The invention provides a display including a display panel and the light source module. The light source module emits light toward the display panel.

According to an embodiment of the invention, the sidewalls and the bottom wall are made of a metal material or a white highly reflective material.

According to an embodiment of the invention, the number of the reflection surfaces gradually increases from where it is relatively close to the light entering opening to where it is relatively close to the bottom wall.

According to an embodiment of the invention, the reflection surface of each of the sidewalls and the bottom wall is a plane surface, an inclined surface, or a cambered surface, and when the reflection surfaces are plane surfaces, a part of the reflection surfaces located at the same sidewall or the bottom wall are connected with each other in a prismatic pattern. In addition, a part of the reflection surfaces of the sidewall or the bottom wall located relatively farther away from the light source are inclined surfaces.

According to an embodiment of the invention, the light source is one of a cold cathode fluorescent lamp (CCFL), a light emitting diode (LED), and a field emission light emitting device.

As described above, the light guide element provided by the invention has a structure different from that of a conventional light guide plate but can also guide the light emitted by a light source and allow the light source to emit uniform light. Thus, a light source module using the light guide element offers a uniform light emission, and a display using the light source module offers a good display quality.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
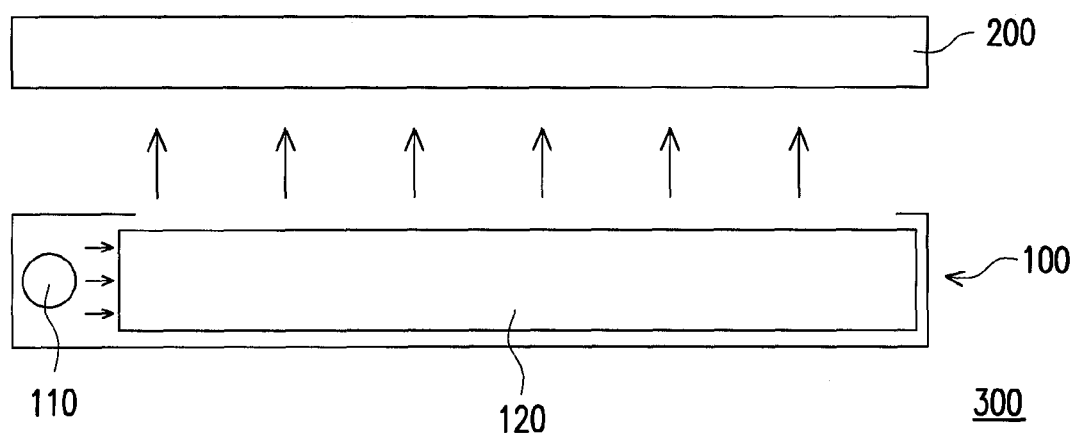
FIG. 1 is a diagram of a display according to the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
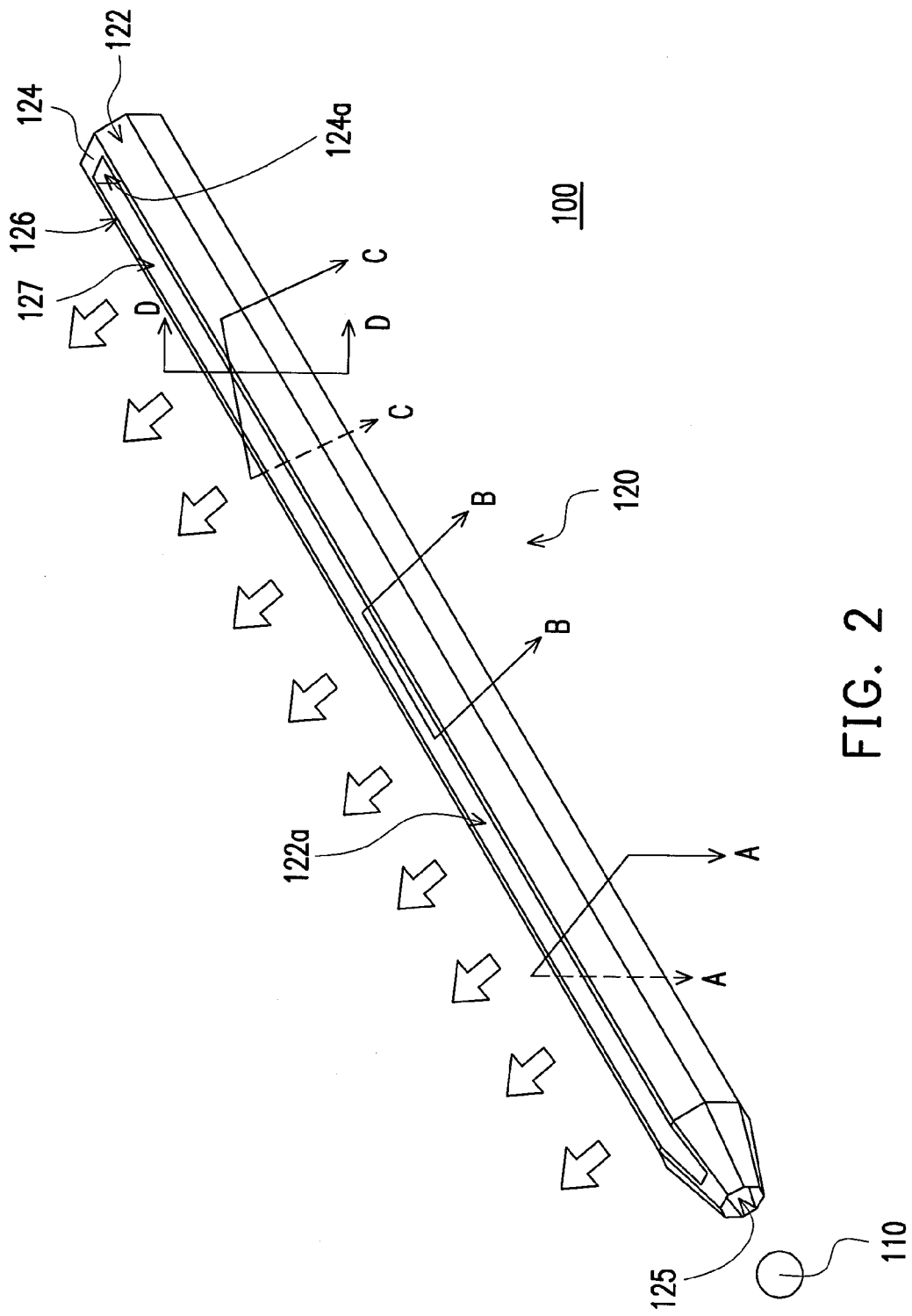
FIG. 2 is a diagram of a light source module of the display in FIG. 1.
Figure 3:
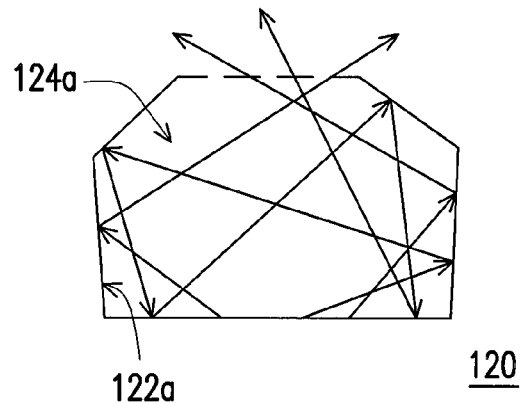
FIG. 3 is a cross-sectional view of the light source module in FIG. 2 along line A-A.

FIG. 1 is a diagram of a display according to the invention. FIG. 2 is a diagram of a light source module of the display in FIG. 1. FIG. 3 is a cross-sectional view of the light source module in FIG. 2 along line A-A. Referring to FIG. 1, FIG. 2, and FIG. 3, the display 300 includes a display panel 200 and a light source module 100. The light source module 100 includes a light source 110 and a light guide element 120. The light source module 100 is disposed below the display panel 200. The light source 110 is disposed beside the light guide element 120. Namely, the light source 110 and the display panel 200 are respectively located at different sides of the light guide element 120 so that light emitted by the light source 110 is guided by the light guide element 120 toward the display panel 200. The light source 110 may be at least one of a cold cathode fluorescent lamp (CCFL), a light emitting diode (LED), and a field emission light emitting device according to the actual requirement. The light guide element 120 includes a plurality of sidewalls 122 and a bottom wall 124. The sidewalls 122 surround the bottom wall 124 and are connected with each other to form a light entering opening 125, a light exiting opening 126, and an inner reflection room 127. Each sidewall 122 has at least one reflection surface 122a, and the bottom wall 124 has at least one reflection surface 124a. The reflection surfaces 122a and the reflection surfaces 124a all face the inner reflection room 127. The light source 110 is located at the light entering opening 125 of the light guide element 120 so that when light emitted by the light source 110 reaches the reflection surfaces 122a and 124a via the light entering opening 125, the light is reflected by the reflection surfaces 122a and 124a.

The sidewalls 122 and the bottom wall 124 may be made of a metal material or a white highly reflective material, and the light guide element 120 may be formed integrally by the sidewalls 122 and the bottom wall 124. In other embodiments, the sidewalls 122 and the bottom wall 124 may also be bonded, tightly fitted, or locked together to constitute the light guide element 120.

The sidewalls 122 and the bottom wall 124 may also be made of other materials. However, in order to achieve a light guiding effect, a reflective material needs to be adhered or coated over the surfaces of the sidewalls 122 and the bottom wall 124 those face the inner reflection room 127 to form the reflection surfaces 122a and 124a, wherein the reflective material should have a high reflectivity.

Referring to FIG. 1, FIG. 2, and FIG. 3, when the light source 110 of the light source module 100 emits light, the light emitted by the light source 110 enters the inner reflection room 127 via the light entering opening 125. Since the sidewalls 122 are disposed around the bottom wall 124 according to the shape of the bottom wall 124, when the light reaches the reflection surfaces 122a and 124a, part of the light is reflected by the reflection surfaces 122a and 124a and exits from the light exiting opening 126, and another part of the light is reflected to other reflection surfaces 122a or 124a within the inner reflection room 127 according to the incident angle and incident direction thereof. Before the reflected light exits the light guide element 120 via the light exiting opening 126, it is repeatedly reflected by the reflection surfaces 122a or 124a within the inner reflection room 127.

To be specific, in the present embodiment, the light guide element 120 presents the shape of a hollow box such that after light enters the light guide element 120 via the light entering opening 125, the light is repeatedly reflected until it exits via the light exiting opening 126. Since the light guide element 120 in the present embodiment has only two openings (i.e., the light entering opening 125 and the light exiting opening 126), it offers lower optical loss compared to a conventional light guide plate made of a solid transparent material. Thus, both the luminous efficiency and luminous uniformity of the light source module 100 are improved, and the display quality of the display 300 which uses the light source module 100 having the light guide element 120 is also improved.

Figure 4:
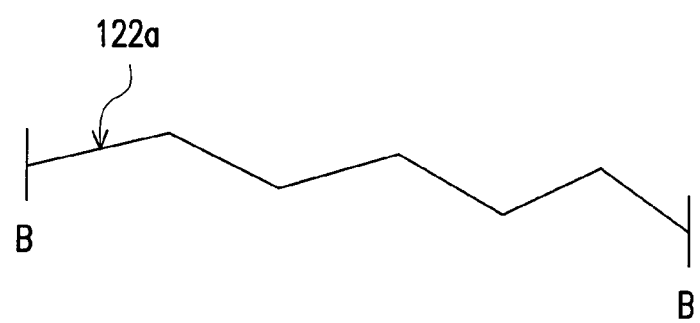
FIG. 4 is a cross-sectional view of the light source module in FIG. 2 along line B-B.

Additionally, the reflection surfaces 122a and 124a of the sidewalls 122 and the bottom wall 124 may be plane surfaces or cambered surfaces according to the actual requirement. Moreover, the luminosity of the light source module 100 varies with the relative distance to the light source 110. In order to increase the luminosity at positions relatively farther away from the light source 110 and improve the luminous uniformity of the light source module 100, when the reflection surfaces 122a and 124a are plane surfaces, some of the reflection surfaces 122a and 124a located at the same sidewall 122 or the bottom wall 124 may be further connected with each other in a prismatic pattern. FIG. 4 is a cross-sectional view of the light source module in FIG. 2 along line B-B. To make it easier to be understood, only the reflection surfaces 122a located at the bottoms of the sidewalls 122 are illustrated in FIG. 4. Those skilled in the art should be able to apply such a prismatic connection pattern to other sidewalls 122 or the bottom wall 124 according to the actual requirement. By connecting the reflection surfaces 122a in the prismatic pattern, an effect equivalent to that of a prism can be achieved. Accordingly the luminosity of the light source module 100 at positions relatively farther away from the light source 110 is increased, and the luminous uniformity of the light source module 100 is improved.

Figure 5A:
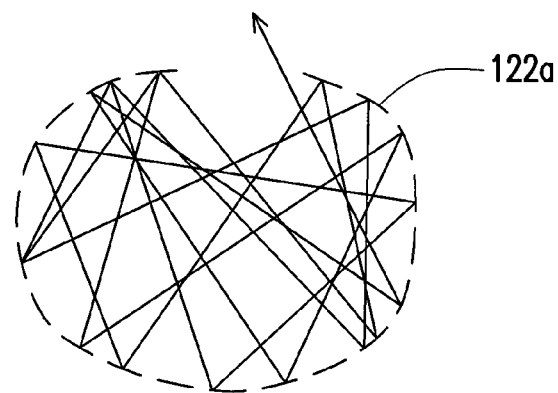
FIG. 5A is a cross-sectional view of the light source module in FIG. 2 along line C-C.

In another embodiment, the number of the reflection surfaces 122a and 124a may be adjusted to make the luminosity at positions relatively farther away from the light source 110 to be approximately the same as the luminosity at positions relatively closer to the light source 110. FIG. 5A is a cross-sectional view of the light source module in FIG. 2 along line C-C. referring to both FIG. 3 and FIG. 5A, to be specific, the number of the reflection surfaces 122a gradually increases from where it is relatively close to the light entering opening 125 to where it is relatively close to the bottom wall 124. Thus, the reflection surfaces 122a present a near round shape at where it is relatively close to the bottom wall 124.

Figure 5B:
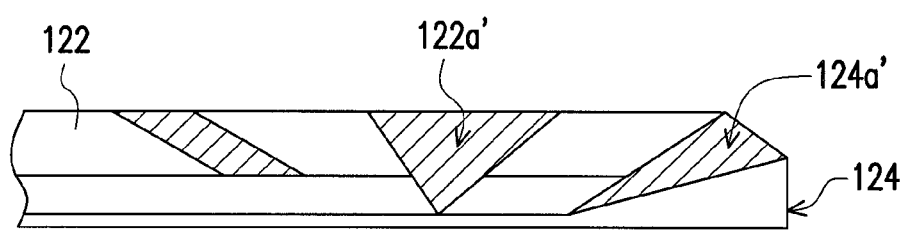
FIG. 5B is a cross-sectional view of the light source module in FIG. 2 along line D-D.

FIG. 5B is a cross-sectional view of the light source module in FIG. 2 along line D-D. Referring to both FIG. 2 and FIG. 5B, another method for increasing the luminosity of the light source module 100 at positions relatively farther away from the light source 110 is to fabricate some of the reflection surfaces 122a' and 124a' as inclined surfaces (as the blocks indicated with diagonal lines in FIG. 5B). This method increases the number of the reflection surfaces 122a' and 124a' and changes the light reflection directions of the reflection surfaces 122a' and 124a'.

In summary, the light guide element provided by the invention has a structure completely different from the solid structure of a conventional light guide plate but offers the same light guiding effect. In other words, the light guide element in the invention provides a totally different option to those skilled in the art therefore facilitates industrial competitiveness and offers a high industrial applicability. In addition, the light guide element provided by the invention offers lower optical loss compared to a conventional light guide plate. Accordingly, the luminosity of a light source module using the light guide element is increased. Moreover, change in the internal structure of the light guide element increases the luminosity of the light source module at positions relatively farther away from the light source and improves the luminous uniformity of the light source module. Thereby, when light source modules having the light guide element are applied to different displays, the display quality of these displays can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A light guide element, comprising a plurality of sidewalls and a bottom wall, wherein the sidewalls surround the bottom wall and are connected with each other to form a light entering opening, a light exiting opening, and an inner reflection room, each of the sidewalls and the bottom wall has at least one reflection surface, and the reflection surfaces face the inner reflection room, wherein a number of the reflection surfaces gradually increases from where it is relatively close to the light entering opening to where it is relatively close to the bottom wall.

2. The light guide element according to claim 1, wherein a material of the sidewalls and the bottom wall is a metal material or a white highly reflective material.

3. The light guide element according to claim 1, wherein the reflection surface of each of the sidewalls and the bottom wall is a plane surface, an inclined surface, or a cambered surface.

4. The light guide element according to claim 3, wherein the reflection surfaces are plane surfaces, and a part of the reflection surfaces located at the same sidewall or the bottom wall are connected with each other in a prismatic pattern.

5. The light guide element according to claim 3, wherein a part of the reflection surfaces of the sidewall or the bottom wall are inclined surfaces.

6. A light source module, comprising:
a light source; and
a light guide element, comprising a plurality of sidewalls and a bottom wall, wherein the sidewalls surround the bottom wall and are connected with each other to form a light entering opening, a light exiting opening, and an inner reflection room, each of the sidewalls and the bottom wall has at least one reflection surface, the reflection surfaces face the inner reflection room, wherein a number of the reflection surfaces gradually increases from where it is relatively close to the light entering opening to where it is relatively close to the bottom wall, and the light source is located by the light guide element and facing the light entering opening.

7. The light source module according to claim 6, wherein a material of the sidewalls and the bottom wall is a metal material or a white highly reflective material.

8. The light source module according to claim 6, wherein the reflection surface of each of the sidewalls and the bottom wall is a plane surface, an inclined surface, or a cambered surface.

9. The light source module according to claim 8, wherein the reflection surfaces are plane surfaces, and a part of the reflection surfaces located at the same sidewall or the bottom wall are connected with each other in a prismatic pattern.

10. The light source module according to claim 8, wherein a part of the reflection surfaces of the sidewall or the bottom wall located relatively farther away from the light source are inclined surfaces.

11. The light source module according to claim 6, wherein the light source is one of a cold cathode fluorescent lamp (CCFL), a light emitting diode (LED), and a field emission light emitting device.

12. A display, comprising:
a display panel;
a light source module, emitting light toward the display panel, the light source module comprising:
a light source; and
a light guide element, comprising a plurality of sidewalls and a bottom wall, wherein the sidewalls surround the bottom wall and are connected with each other to form a light entering opening, a light exiting opening, and a inner reflection room, each of the sidewalls and the bottom wall has at least one reflection surface, the reflection surfaces face the inner reflection room, wherein a number of the reflection surface gradually increases from where it is relatively close to the light entering opening to where it is relatively close to the bottom wall, and the light source is located by the light guide element and facing the light entering opening.

13. The display according to claim 12, wherein a material of the sidewalls and the bottom wall is a metal material or a white highly reflective material.

14. The display according to claim 12, wherein the reflection surface of each of the sidewalls and the bottom wall is a plane surface or a cambered surface.

15. The display according to claim 14, wherein the reflection surfaces are plane surfaces, and a part of the reflection surfaces located at the same sidewall or the bottom wall are connected with each other in a prismatic pattern.

16. The display according to claim 14, wherein a part of the reflection surfaces of the sidewall or the bottom wall located relatively farther away from the light source are inclined surfaces.

17. The display according to claim 12, wherein the light source is one of a CCFL, a LED, and a field emission light emitting device.

* * * * *